May 23, 1944.  H. KOPPERS  2,349,439
CONTRIVANCE FOR THE HEATING OF GASES
Filed Dec. 27, 1939  4 Sheets-Sheet 1

May 23, 1944.                H. KOPPERS                    2,349,439
              CONTRIVANCE FOR THE HEATING OF GASES
                    Filed Dec. 27, 1939           4 Sheets-Sheet 2

May 23, 1944.  H. KOPPERS  2,349,439
CONTRIVANCE FOR THE HEATING OF GASES
Filed Dec. 27, 1939  4 Sheets-Sheet 3

May 23, 1944.                H. KOPPERS                2,349,439
                CONTRIVANCE FOR THE HEATING OF GASES
                    Filed Dec. 27, 1939        4 Sheets-Sheet 4
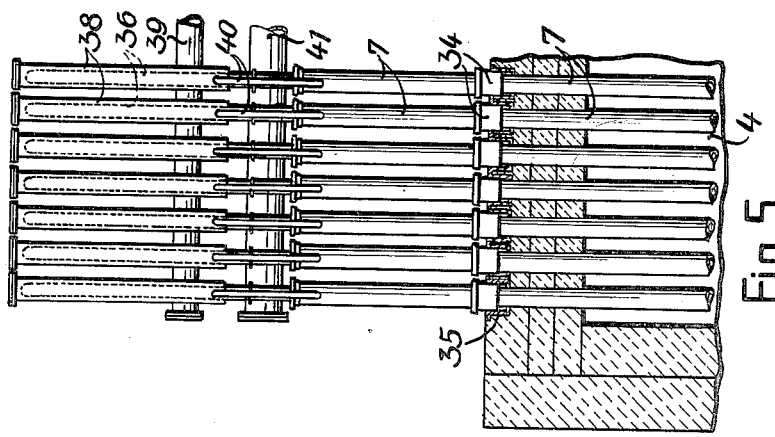
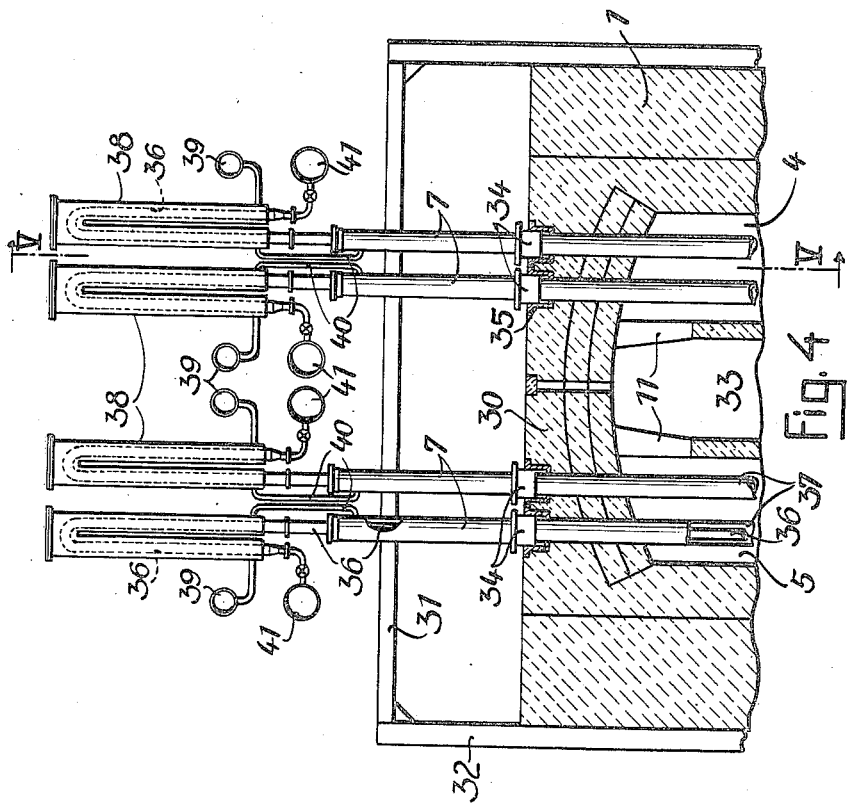

Patented May 23, 1944

2,349,439

UNITED STATES PATENT OFFICE 2,349,439

CONTRIVANCE FOR THE HEATING OF GASES

Heinrich Koppers, Essen, Germany, assignor, by mesne assignments, to Koppers Company, Pittsburgh, Pa., a corporation of Delaware Application December 27, 1939, Serial No. 311,135
In Germany December 31, 1938

7 Claims. (Cl. 23—277)

This invention relates to apparatus for the heating of gases, and more particularly for the carrying out of endothermic gas reactions, such as for the conversion of mixtures consisting of steam and hydrocarbon gases, if necessary in the presence of catalysts, in metallic pipes disposed in chambers which are separated from heating chambers therefor.

The main object of my invention is to transfer the heat on to the metallic pipes, through which the gas to be treated is passed, in such manner that large quantities of heat can be taken up by the pipes without causing a local superheating of the pipes. Another feature of this invention is to provide apparatus for carrying out the gas heating with a high thermal efficiency and to utilize the heat of the gases to be treated in a most favourable way.

According to this invention, the pipes used for the heating of the gases, and more particularly for carrying out the endothermic gas reactions, are arranged vertically in one or several rows within one or several chambers and the combustion chambers for the heat treatment are placed parallel thereto. These combustion chambers are provided at their bottoms with openings for the inlet of heating gas and combustion air, and they are in communication above and below with the pipe chamber, at the lower end of which is situated the smoke gas outlet.

The gas heating apparatus of the invention offers the special advantage that it is possible to burn the heating media at a very high temperature, and consequently with a very good thermal efficiency, without effecting a direct influence of the high combustion temperatures upon the metallic gas heater pipes. By arranging upper and lower connecting openings in the partition wall between the combustion chamber and pipe chamber, and by arranging the smoke gas outlet at the bottom of the pipe chamber, a part of the cooled smoke gases from the pipe chamber passes through the lower connecting opening into the combustion chamber where it is mixed with the combustion media. This mixing of the smoke gases with the combustion gases results in a reduction of the temperature of combustion causing a corresponding increase of the gas volume, so that the necessary amount of heat is transferred onto the metallic pipes of the gas heater by larger quantities of gas of low temperature lying below the permissible heating temperatures for the metallic pipes.

Another object of this invention is to subdivide the combustion chamber, which is preferably enclosed on both sides by the pipe chambers lying at the longitudinal sides of the combustion chamber, by means of transverse walls into vertical flues. Into each flue terminates single, or several upper and lower connecting openings which communicates with the pipe chamber. This arrangement has for its aim the result that the cooled smoke gases leaving the pipe chamber and entering the combustion chamber are uniformly mixed with the hot combustion media and no pointed jet flames will develop from the combustion chamber causing a local superheating. By the arrangement of combustion chambers between two pipe chambers, the radiation losses of the combustion chamber, operated at high temperature, are likewise considerably reduced and the heat generated in the combustion chamber is fully utilized for the heating of the pipe chambers.

The invention further consists in the provision of horizontal distributing channels for fuel gas and air, and in the provision of horizontal collecting channels for smoke gases, underneath the combustion and pipe chambers. These distributing and collecting channels are according to this invention coupled with regenerators which are arranged laterally beside the gas heater apparatus and which, by means of suitable shut-off valves arranged in the connecting ducts, are connected with the collecting and distributing channels underneath the chambers.

Finally this invention has for its object to construct and arrange the metallic pipes, traversed by the gas to be treated, in such a manner that they hang freely from the top of the pipe chamber. Into these gas heater pipes, which are closed below, are inserted inner pipes of a smaller diameter, said inner smaller pipes reaching nearly to the bottoms of the outer pipes and serving for the delivery to or discharge from the space between the two of the gas to be treated. Preferably these inner pipes serve for the discharge of the treated gas and in this case a suitable catalytic contact mass may be provided in the annular space between the outer gas heater pipe and the inner gas off-take pipe, thus accelerating the desired conversion within the gas heater pipes.

According to this invention the double-walled gas heater pipes may likewise be elongated above the chamber top by a heat exchanger installed to utilize the heat of the outflowing hot treated gas to preheat the inflowing cold untreated gas to be treated.

With the above and other objects and features of my present invention in view, I shall now describe a preferred embodiment thereof on the lines of the accompanying drawings in which:

Fig. 4 shows on an enlarged scale a cross section through the upper part of the gas heater apparatus with the heat exchanger on top.

Fig. 5 is a longitudinal section through the upper part of the gas heater apparatus on line V—V of Fig. 4.

Like characters of reference are employed to denote similar parts in the several views.

Figure 1:
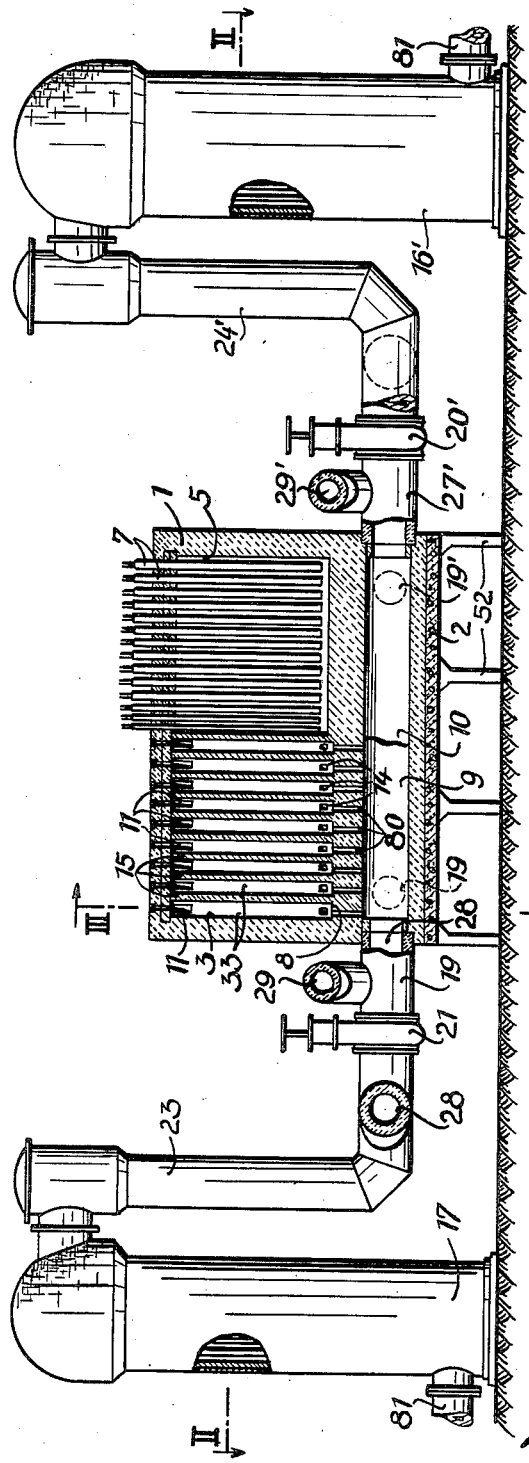
Fig. 1 is a vertical staggered section taken longitudinally through the gas heater apparatus with the regenerators connected therewith, on line I—I partly through the combustion chamber and partly through the pipe chamber.

In the drawings, the numeral 1 designates the outer refractory brickwork for the pipe and combustion chambers of the gas heater which is mounted on a foundation accessible from below consisting of a pad 2 and pillars 52. Three longitudinal chambers 3, 4 and 5, which are separated by walls 6, are arranged side by side in a substantially parallel manner. As may be seen from Fig. 3, the gas heater pipes 7 are disposed in chambers 4 and 5 in two parallel rows facing each other.

The middle chamber 3 serves as a combustion chamber to supply heat for heating the gases flowing through the pipes 7. Ducts 80 through which the fuel gas and combustion air are introduced are provided in the bottom 8. These bottom ducts 80 are in communication with a horizontal air supply channel 9 and a fuel gas supply channel 10 substantially parallel thereto, said ducts are distributed along the whole length of the combustion chamber 3.

The combustion media (gas and air) are burned in the chamber 3. The smoke gases produced will pass through a series of upper outlet ports 11 in the partition walls 6 into the upper part of the pipe chambers 4 and 5 in which they flow downwards. Near the bottom of the pipe chambers are smoke gas off-take ducts 12 leading to the smoke gas collecting channels 13 which lie in the lower part of the apparatus brickwork parallel to the air and gas distributing channels 9 and 10.

Furthermore lower connecting ports 14 are provided in the partition walls 6 between the combustion chamber 3 and the pipe chambers 4, 5. Part of the cooled-down smoke gases flowing through the pipe chambers 4, 5 is led through these lower ports 8 into the combustion chamber 3 where the smoke gases are mixed with the combustion media. This movement of a partial stream of the smoke gases into ports 8 is caused because at the bottom of the combustion chamber 3 a certain underpressure is produced against the pipe chambers 4, 5, due to the draught of the hot combustion media.

The partition walls 6 and the top of the combustion chamber are suitably built of a highly refractory material, for instance sillimanite.

As shown in Fig. 1 a plurality of the bottom ducts 80 for the introduction of gas and air is arranged along the combustion chamber 3. The walls 6 enclosing the combustion chamber 3 are interconnected by a series of transverse walls 15 in such manner that the combustion chamber 3 is subdivided into vertical flues 33 into each of which an upper port 11 and a lower port 14 are arranged in the partition walls 6 as well as an air- and a fuel inlet at the bottoms of the vertical flues. A uniform flow of the combustion media and a most favourable admixture of cooled smoke gas at every point of combustion is thus secured so that no pointed jet flames will develop in any part of the combustion chamber which might cause damage to the metallic pipes 7 of the gas heater by superheating.

The heating of the gas heater pipes 7 is therefore always effected in the same direction. Heating gases of maximum temperature impinge upon the upper end of the heating pipes where the cold gases to be treated flow into the gas heater pipes and a large quantity of heat is consumed in order to bring the gas to the desired reaction temperature. At the lower part of the heating pipe 7 the smoke gases are of lower temperature but one at which they transfer just as much heat to the gas heater pipes as is necessary for maintaining and completing the reaction in the upper part of the pipes as the treated gas flows off. The heating system according to this invention allows for the transfer of the heat in the most favourable way to the gas heater pipes, since by arranging the combustion chamber between two pipe chambers the heat loss from the combustion chamber, when operating at high temperature, is reduced to a minimum.

In order to be able to run the gas heater apparatus with the most favourable thermal efficiency, a regenerative preheating of the fuel gas and combustion air is provided in connection with the apparatus shown on the drawing. Laterally of each longitudinal end of the gas heater apparatus 1 there are provided a pair of air heaters 16, 16' and gas heaters 17, 17'. From the horizontal collecting and distributing channels 9, 10, 13 in the lower part of the apparatus 1, pipe lines lead to the regenerators 16, 17 controlled by suitable shut-off valves.

Figure 2:
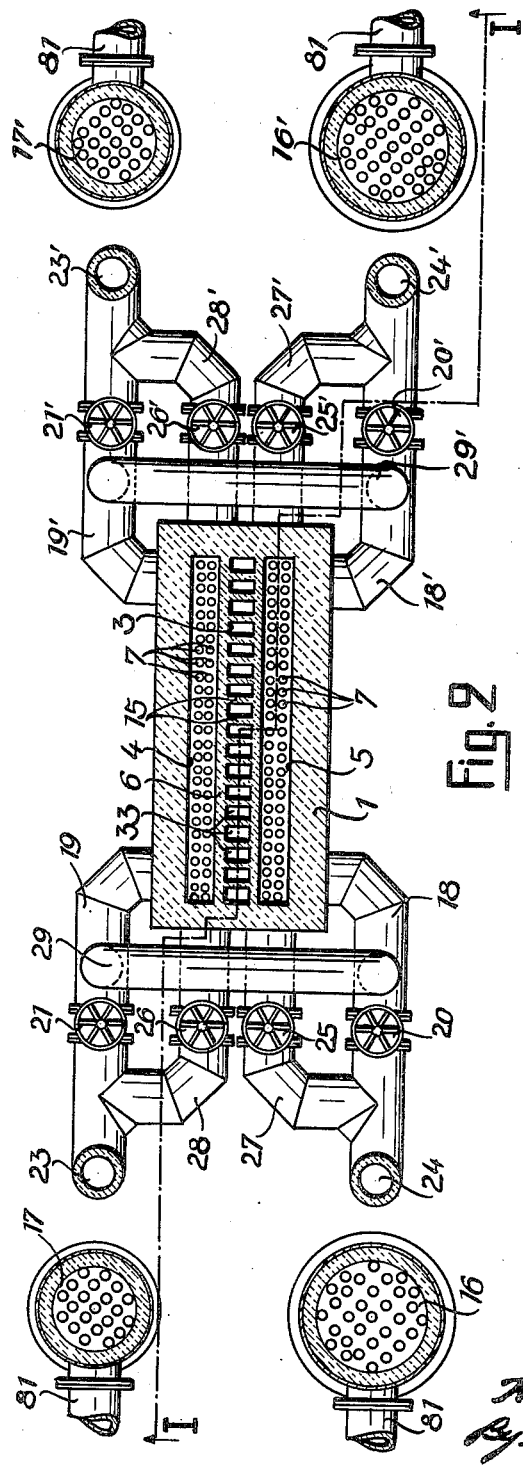
Fig. 2 is a horizontal section on line II—II of Fig. 1.

As may be seen from Fig. 2, the smoke gas channels 13 on the left end of the gas heater apparatus 1 are connected by way of the pipes 18, 19 which are controlled by the shut-off valves 20, 21. The air regenerator 16 is connected with the air distributing channel 9 by the pipe line 27 which is joined to the pipe line 18. The fuel gas regenerator 17 is connected with the fuel gas distributing channel 10 by the pipe line 28 which is joined to the pipe line 19. The pipe lines 18 and 27 combine to the pipe line 24 and the pipe lines 19 and 28 combine to the pipe line 23 each leading to the upper end of the regenerators.

In the pipe lines 27, 28 are provided shut-off valves 25, 26.

The regenerators 16', 17' shown on the right side of Fig. 2 are similarly connected with the horizontal distributing and collecting channels 9, 10, 13 of the gas heater apparatus 1.

Fig. 2 further shows that the smoke gas pipe lines 18 and 19 are also interconnected through a pipe line 29 in advance of the shut off valves 20, 21. An equalizing or balancing of the quantities of smoke gas discharge from the smoke gas collecting channel 13 can take place by this connecting pipe in such a manner that a correspondingly greater quantity of hot smoke gas is delivered to the larger air regenerator 16 whereas a correspondingly smaller quantity of smoke gas is fed to the small gas regenerator 17. The distribution of smoke gas is done by a suitable adjustment of the shut-off and regulating valves 20, 21 or by a suitable adjustment of the chimney damper provided for the regenerators 16, 17.

During one heating period, the regenerators 16, 17 shown on the left side of Fig. 2 serve for instance to preheat combustion air and fuel gas i. e. generator gas. The valves 20 and 21 in the left half of Fig. 2 are in this event closed and the valves 25 and 26 are opened so that the regenerated heated air and fuel gas from the regenerators 16, 17 may flow through the vertical pipe lines 23, 24 into the pipe lines 27, 28 and thence into the horizontal distributing and collecting channels 9, 10 of gas heater apparatus 1.

During this operating period the regenerators 16' and 17' in the right half of Fig. 2 serve to accumulate the heat from the outflowing hot smoke gases. On the right half of Fig. 2 the valves 25' and 26' are at this time closed and the shut-off valves 20' and 21' are opened so that the smoke gas from the horizontal smoke gas channels 13 of the apparatus 1 may flow into the large air regenerator 16' and the small gas regenerator 17'. The regenerators 16 and 17, 16', 17' are connected through the pipes 81 with a chimney not shown in the drawings. As soon as the temperature of the regenerators 16, 17 on the left half of Fig. 2 has dropped to such a degree that the heating media flowing through the regenerators are no longer raised to the necessary preheating temperature, the direction of flow of air, fuel gas and smoke gas is changed. Then the regenerators 16', 17' on the right half of Fig. 2 serve to heat up the combustion media and the regenerators 16, 17 on the left half of Fig. 2 serve to accumulate the heat from the smoke gases.

It is especially pointed out that notwithstanding such change in direction of flow through the regenerators 16, 17 the combustion within the vertical flues 33 always takes place in the same direction.

Figure 3:
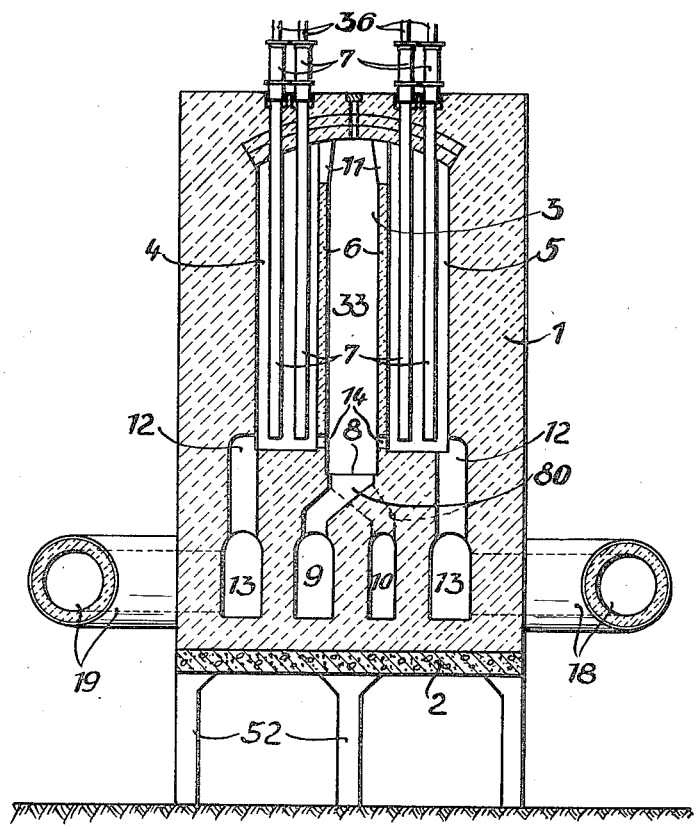
Fig. 3 is a vertical cross section taken through the gas heater apparatus on line III—III of Fig. 1.

The special design of the metallic pipes 7, for the preheating of the gases to be treated, as provided in the apparatus 1, must be mentioned in particular. As shown in Figs. 3 and 4, the gas heater pipes 7 extend through the top 30 of the apparatus 1 and are freely suspended therein from the top of the pipe chambers 4, 5.

The metallic pipes 7 are closed at their cover ends and may thus expand freely to the bottoms of the chambers 4, 5 on being heated up, so that no pressure is exerted upon them. The pipes 7 extend upwardly above the top 30 and are fixed to a frame 31 which lies above the top 30.

The frame 31 is carried by supports 32 which are independent of the brickwork 1. Between the pipes 7 and the top 30 of the gas heater exists a clearance 35 so that the brickwork may freely expand relatively to the pipes 7 on being heated to operating temperature. The sealing of the space between the pipes 7 and the top 30 is effected by movable sleeves 34 which engage into cup-like recesses 35 in the chamber top 30. The packing material can therefore follow the relative movements of the brickwork against the gas heater pipes.

The gas heater pipes 7 are made of a heat resisting material, for instance a chrome-iron alloy, and are of such a diameter that a central pipe 36 may be installed in them which pipe 36 reaches nearly to the bottom of the pipe 7 (see Fig. 4). These inner pipes 36 serve for the delivery into or discharge of media from the metallic pipes 7.

The pipes 36 are preferably used for the withdrawal of the treated gases from the pipes 7. In this case the annular space 37 between the inner pipe 36 and the outer heater pipe 7 may be filled with a suitable contact mass which accelerates the conversion to be carried out within the pipes. It is advantageous to keep the upper part of the pipes 7 adjacent to the upper gas outlet ports 11 in the partition walls 6 free of contact mass so that in this part of the pipe 7 only the gases are heated.

The double walled heater pipe 7 may suitably be elongated towards the outside by the provision of heat exchangers 38 in which the incoming cold gas is preheated by means of the hot reaction gases flowing off. The heat exchanger pipes 38 are connected with the pipes 39 for the incoming cold gas or gas air mixture to be treated. The preheated media are delivered from the heat exchanger 38 through the connecting pipes 40 into the outer annular space 37 of the pipes 7. The inner pipes 36 installed in the pipes 7 each directly lead into a return bend conduit of the heat exchanger which is connected with one of the collecting pipes 41 for offtake of the converted gas.

The gas heater apparatus may also be heated with coke oven gas which is likewise delivered through the distributing channel 10. In such a case, the gas regenerators 17, 17' are unnecessary. The apparatus can also be constructed in such manner that it is capable of being heated alternatively with either producer gas or with coke oven gas at will as required.

I have now above described my present invention on the lines of a preferred embodiment thereof, but my invention is not limited in all its aspects to the mode of carrying it out as described and shown, since the invention may be variously embodied within the scope of the following claims.

I claim:

1. Apparatus for carrying out endothermic gas reactions comprising: a pipe heating chamber in which are arranged vertically a row of pipes through which the gas to be treated is conducted, a combustion chamber disposed alongside said pipe heating chamber, a partition wall between the combustion and pipe heating chambers, port means in the lower part of the combustion chamber for inlet of combustion air and fuel gas thereto for ignition at the lower part of the combustion chamber, outlet means for off-flow of smoke-gases at the lower part of the pipe heating chamber, port openings between the upper parts of the chambers for the passage of the hot combustion gases produced in the combustion chamber into the pipe chamber, and port openings between the lower parts of the chambers for circulation of off-flowing smoke gases from the lower part of the pipe heating chamber back into the lower part of the combustion chamber at the region of the port means for inlet of combustion air and fuel gas to lower part of the combustion chamber.

2. Apparatus as claimed in claim 1, and in which vertical transverse walls are arranged within the combustion chamber to form separate vertical flues therein each of which is provided with the aforesaid port means, and each of which is connected at their upper and lower parts with the pipe heating chamber by the aforesaid port openings.

3. Apparatus for carrying out endothermic gas reactions comprising: a combustion chamber constituted of a row of vertical flues, pipe heating chambers on opposite sides of said combustion chamber and each having a row of vertical pipes therein through which the gas to be treated is conducted, port means in the lower parts of the vertical flues for inlet of combustion air and fuel gas thereto for ignition at the lower parts of the vertical flues, outlet means for off-flow of smoke gases at the lower parts of each of the pipe heating chambers, port openings between the upper parts of each of the vertical flues and the upper parts of each of the pipe heating chambers for passage of the hot combustion gases from the lower parts of the vertical flues into the upper ends and thence downwardly through the pipe heating chambers to said outlet means for smoke gases, and port openings between the lower parts of the pipe heating chambers and the lower parts of the vertical flues for circulation of off-flowing smoke gases from the lower parts of the pipe heating chambers back into the vertical heating flues at the region of the port means for inlet of combustion air and fuel gas to the vertical flues.

4. Apparatus as claimed in claim 3, and in which horizontal channels are arranged underneath the combustion and pipe heating chambers, said channels serving for the distribution of fuel gas and air to the port means and for the withdrawal of smoke gases from the outlet means therefor.

5. Apparatus as claimed in claim 1, and in which the vertical pipes traversed by the gas to be treated are suspended from supports outside and above the pipe chamber and are closed below, said vertical pipes having, for the inflow and withdrawal of reaction gas, a pipe of smaller diameter installed inside the same, reaching to near the bottom of the outer pipe.

6. Apparatus as claimed in claim 3, and in which the vertical pipes are connected above the pipe heating chamber with heat exchangers, said heat exchangers being coupled with the pipe for leading off the treated gases in such a way that the treated gases flow through the heat-exchanger in countercurrent to the untreated inflowing gases.

7. Apparatus as claimed in claim 3, and in which the vertical pipes are connected above the pipe heating chamber with heat exchangers, said heat exchangers being coupled with the pipe for leading off the treated gases in such a way that the treated gases flow through the heat-exchanger in countercurrent to the untreated inflowing gases, and in which the vertical pipes and heat exchanger are supported from a special frame above the chamber top freely independent of expansion of the brickwork of the chamber structure, with the pipes sealed against the chamber structure by means of packing materials for possible longitudinal and transverse movement at the juncture of the pipes with the chamber top structure.

HEINRICH KOPPERS.